US007857220B2

(12) United States Patent
Marty et al.

(10) Patent No.: US 7,857,220 B2
(45) Date of Patent: Dec. 28, 2010

(54) SYSTEMS, DEVICES, AND METHODS FOR READING MACHINE-READABLE CHARACTERS AND HUMAN-READABLE CHARACTERS

(75) Inventors: William A. Marty, Seattle, WA (US); Daniel Dean, Snohomish, WA (US); H. Sprague Ackley, Seattle, WA (US)

(73) Assignee: Intermac IP Corp., Everett, WA (US)

( * ) Notice: Subject to any disclaimer, the term of this patent is extended or adjusted under 35 U.S.C. 154(b) by 0 days.

(21) Appl. No.: 12/463,947

(22) Filed: May 11, 2009

(65) Prior Publication Data

US 2009/0272812 A1    Nov. 5, 2009

Related U.S. Application Data

(62) Division of application No. 11/687,555, filed on Mar. 16, 2007, now Pat. No. 7,546,955.

(51) Int. Cl.
*G06K 5/04* (2006.01)
*G06K 7/10* (2006.01)
*G06K 9/32* (2006.01)

(52) U.S. Cl. ............... 235/462.08; 235/462.01; 235/462.09; 235/462.1; 235/462.14; 235/462.45; 235/462.49; 235/472.01; 235/472.02; 235/472.03

(58) Field of Classification Search ............... 235/454, 235/462.01, 462.07, 462.09, 462.1, 462.14, 235/462.45, 462.49, 472.01–472.03, 462.08
See application file for complete search history.

(56) References Cited

U.S. PATENT DOCUMENTS

| 4,056,710 | A | 11/1977 | Shepardson et al. | 235/437 |
| 4,079,482 | A | 3/1978 | Yeh | 197/1 A |
| 4,307,293 | A | 12/1981 | Lazzarotti et al. | 235/462 |
| 4,354,101 | A | 10/1982 | Hester et al. | 235/463 |
| 4,385,231 | A | 5/1983 | Mizutani et al. | 235/382 |
| 4,443,794 | A | 4/1984 | Sakurai | 340/748 |

(Continued)

FOREIGN PATENT DOCUMENTS

DE    33 30 261    3/1985

(Continued)

OTHER PUBLICATIONS

AIM USA, "Uniform Symbology Specification Code 93," Apr. 1993, pp. 1-10.

(Continued)

*Primary Examiner*—Thien M. Le
*Assistant Examiner*—Tuyen K Vo
(74) *Attorney, Agent, or Firm*—Seed IP Law Group PLLC

(57) ABSTRACT

Systems, devices, and methods for automatic data collection. An automatic data collection system includes an image capture subsystem and a processor subsystem. The automatic data collection system is operable to decode machine-readable symbols in a machine-readable symbol reading mode, and to automatically switch from a machine-readable symbol reading mode to an optical character recognition mode in response to information encoded in a machine-readable symbol. In some embodiments, the automatic data collection system is further operable to perform optical character recognition on human-readable symbols in a human-readable symbol reading mode.

11 Claims, 11 Drawing Sheets

U.S. PATENT DOCUMENTS

| | | | | |
|---|---|---|---|---|
| 4,523,087 A | 6/1985 | Benton | | 235/379 |
| 4,567,361 A | 1/1986 | Rosenthal | | 235/462 |
| 4,575,621 A | 3/1986 | Dreifus | | 235/380 |
| 4,589,144 A | 5/1986 | Namba | | 382/61 |
| 4,728,784 A | 3/1988 | Stewart | | 235/462 |
| 4,782,221 A | 11/1988 | Brass et al. | | 235/494 |
| 4,785,451 A | 11/1988 | Sako et al. | | 371/37 |
| 4,786,792 A | 11/1988 | Pierce et al. | | 235/456 |
| 4,792,910 A | 12/1988 | Lange | | 364/519 |
| 4,794,239 A | 12/1988 | Allais | | 235/462 |
| 4,810,867 A | 3/1989 | Speicher | | 235/494 |
| 4,823,311 A | 4/1989 | Hunter et al. | | 364/900 |
| 4,827,395 A | 5/1989 | Anders et al. | | 364/138 |
| 4,841,128 A | 6/1989 | Gröttrup et al. | | 235/491 |
| 4,855,581 A | 8/1989 | Mertel et al. | | 235/462 |
| 4,916,296 A | 4/1990 | Streck | | 235/454 |
| 4,980,544 A | 12/1990 | Winter | | 235/436 |
| 5,097,263 A | 3/1992 | Delpech et al. | | 341/155 |
| 5,128,526 A | 7/1992 | Yoshida | | 235/456 |
| 5,160,023 A | 11/1992 | Adams et al. | | 206/256 |
| 5,184,005 A | 2/1993 | Ukai et al. | | 235/472 |
| 5,204,515 A | 4/1993 | Yoshida | | 235/456 |
| 5,216,233 A | 6/1993 | Main et al. | | 235/472 |
| 5,216,419 A | 6/1993 | Fujisaka et al. | | 340/825.54 |
| 5,218,689 A | 6/1993 | Hotle | | 395/425 |
| 5,243,655 A | 9/1993 | Wang | | 380/51 |
| 5,278,395 A | 1/1994 | Benezet | | 235/384 |
| 5,280,159 A | 1/1994 | Schultz et al. | | 231/382 |
| 5,298,731 A | 3/1994 | Ett | | 235/494 |
| 5,300,761 A | 4/1994 | Kasahara et al. | | 235/375 |
| 5,324,922 A | 6/1994 | Roberts | | 235/375 |
| 5,324,927 A | 6/1994 | Williams | | 235/494 |
| 5,341,381 A | 8/1994 | Fuller | | 371/10.1 |
| 5,380,998 A | 1/1995 | Bossen et al. | | 235/494 |
| 5,382,778 A | 1/1995 | Takahira et al. | | 235/380 |
| 5,382,784 A | 1/1995 | Eberhardt | | 235/472 |
| 5,387,783 A | 2/1995 | Mihm et al. | | 235/375 |
| 5,389,770 A | 2/1995 | Ackley | | 235/462 |
| 5,420,403 A | 5/1995 | Allum et al. | | 235/375 |
| 5,434,401 A | 7/1995 | Bauser | | 235/454 |
| 5,434,572 A | 7/1995 | Smith | | 342/44 |
| 5,463,643 A | 10/1995 | Gaskins et al. | | 371/40.1 |
| 5,479,515 A | 12/1995 | Longacre, Jr. | | 380/54 |
| 5,484,997 A | 1/1996 | Haynes | | 235/492 |
| 5,489,908 A | 2/1996 | Orthmann et al. | | 342/42 |
| 5,514,858 A | 5/1996 | Ackley | | 235/462 |
| 5,521,601 A | 5/1996 | Kandlur et al. | | 342/44 |
| 5,521,815 A | 5/1996 | Rose, Jr. | | 364/409 |
| 5,528,222 A | 6/1996 | Moskowitz et al. | | 340/572 |
| 5,536,924 A | 7/1996 | Ackley | | 235/454 |
| 5,539,191 A | 7/1996 | Ackley | | 235/462 |
| 5,548,110 A | 8/1996 | Storch et al. | | 235/472 |
| 5,550,365 A | 8/1996 | Klancnik et al. | | 235/462 |
| 5,550,547 A | 8/1996 | Chan et al. | | 342/44 |
| 5,552,591 A | 9/1996 | Bossen et al. | | 235/462 |
| 5,553,084 A | 9/1996 | Ackley et al. | | 371/37.1 |
| 5,557,092 A * | 9/1996 | Ackley et al. | | 235/462.07 |
| 5,563,402 A | 10/1996 | Reddersen et al. | | 235/436 |
| 5,594,228 A | 1/1997 | Swartz et al. | | 235/383 |
| 5,612,531 A | 3/1997 | Barkan | | 235/462 |
| 5,619,027 A | 4/1997 | Ackley | | 235/462 |
| 5,629,508 A | 5/1997 | Findley, Jr. et al. | | 235/38 R |
| 5,640,002 A | 6/1997 | Ruppert et al. | | 235/472 |
| 5,659,431 A | 8/1997 | Ackley | | 359/798 |
| 5,673,037 A | 9/1997 | Cesar et al. | | 340/825.54 |
| 5,723,853 A | 3/1998 | Longacre, Jr. et al. | | 235/472 |
| 5,761,219 A * | 6/1998 | Maltsev | | 714/752 |
| 5,761,529 A | 6/1998 | Raji et al. | | 395/824 |
| 5,763,867 A | 6/1998 | Main et al. | | 235/472 |
| 5,767,498 A | 6/1998 | Heske, III et al. | | 235/463 |
| 5,777,310 A | 7/1998 | Liu et al. | | 235/462 |
| 5,777,561 A | 7/1998 | Chieu et al. | | 340/825.54 |
| 5,788,796 A | 8/1998 | Look et al. | | 156/277 |
| 5,805,082 A | 9/1998 | Hassett | | 340/928 |
| 5,811,781 A | 9/1998 | Ackley | | 235/462 |
| 5,818,031 A * | 10/1998 | Endoh | | 235/494 |
| 5,874,896 A | 2/1999 | Lowe et al. | | 340/572 |
| 5,979,773 A | 11/1999 | Findley, Jr. et al. | | 235/492 |
| 6,003,775 A | 12/1999 | Ackley | | 235/472.01 |
| 6,012,638 A | 1/2000 | Ackley et al. | | 235/462.01 |
| 6,024,289 A | 2/2000 | Ackley | | 235/494 |
| 6,025,784 A | 2/2000 | Mish | | 340/693.5 |
| 6,076,064 A | 6/2000 | Rose, Jr. | | 705/1 |
| 6,092,133 A | 7/2000 | Erola et al. | | 710/102 |
| 6,097,301 A | 8/2000 | Tuttle | | 340/693.9 |
| 6,149,059 A | 11/2000 | Ackley | | 235/462 |
| 6,272,242 B1 | 8/2001 | Saitoh et al. | | 382/187 |
| 6,286,763 B1 | 9/2001 | Reynolds et al. | | 235/472.01 |
| 6,321,986 B1 * | 11/2001 | Ackley | | 235/462.01 |
| 6,360,208 B1 | 3/2002 | Ohanian | | 705/31 |
| 6,371,375 B1 * | 4/2002 | Ackley et al. | | 235/462.45 |
| 6,422,476 B1 | 7/2002 | Ackley | | 235/494 |
| 6,585,159 B1 * | 7/2003 | Meier et al. | | 235/462.31 |
| 7,328,851 B1 | 2/2008 | Iftime et al. | | 235/494 |
| 7,458,612 B1 | 12/2008 | Bennett | | 283/81 |
| 2003/0218069 A1 * | 11/2003 | Meier et al. | | 235/462.25 |
| 2008/0011822 A1 * | 1/2008 | Ackley et al. | | 235/375 |

FOREIGN PATENT DOCUMENTS

| | | |
|---|---|---|
| EP | 0 667 592 A1 | 8/1995 |
| FR | 2 760 209 | 9/1998 |
| JP | 403113673 A | 5/1991 |
| JP | 10040329 A | 2/1998 |
| WO | WO 95/12863 | 5/1995 |
| WO | WO 96/13803 | 5/1996 |
| WO | WO 98/47101 | 10/1998 |

OTHER PUBLICATIONS

AIM USA, "Uniform Symbology Specification Code One," Jul. 1994, pp. 1-32.

AIM USA, "Uniform Symbology Specification PDF417," Jul. 1994, pp. 1-34. International Product Code (IPC)-2D Symbology Specification, Version: Sep. 7, 1997, pp. 1-7.

AIM USA, "Uniform Symbology Specification Code 16K," American National Standards Institute, Inc., Approved Aug. 16, 1995, pp. 1-17.

AIM USA, "Uniform Symbology Specification Code 49," American National Standards Institute, Inc., Approved Aug. 16, 1995, pp. 1-26.

AIM USA, "Uniform Symbology Specification Code 128," American National Standards Institute, Inc., Approved Aug. 16, 1995, pp. 1-12.

AIM USA, "Uniform Symbology Specification Code 39", American National Standards Institute, Inc. Approved Aug. 16, 1995, pp. 1-11.

AIM USA, "Uniform Symbology Specification Interleaved 2-of-5", American National Standards Institute, Inc. Approved Aug. 16, 1995, pp. 1-11.

AIM USA, "Uniform Symbology Specification Codabar", American National Standards Institute, Inc. Approved Aug. 16, 1995, pp. 1-11.

U.S. Appl. No. 09/328,028, filed Jun. 8, 1999, Wiklof et al.

U.S. Appl. No. 09/375,815, filed Aug. 17, 1999, Ackley.

U.S. Appl. No. 09/375,913, filed Aug. 17, 1999, Ackley.

AIM USA, "Uniform Symbology Specification Code 93", American National Standards Institute, Inc. Approved Aug. 16, 1995, pp. 1-10.

AIM International, Inc., International Symbology Specification—Data Matrix, pp. 1-95.

AIM International, Inc., "International Symbology Specification MaxiCode," pp. 1-44.

AIM International, Inc., "International Technical Specification—Symbology Identifiers", Jun. 18, 1998, Document Version 1.0, pp. 1-17.

AIM USA, "Understanding 2d Symbologies, A Detailed Overview and Technical Introduction," Copyright 1999, pp. 1-50.

Alphanumeric Data Compaction, Rev. C., Intermec Corporation, Everett, Washington, 1992, 6 pages.

Arthur, NN81102407 IBM Technical Disclosure Bulletin, Oct. 1981, vol. 24, Issue 5, p. 2407.

"Bar Code Compression Decompression," IBM Technical Disclosure Bulletin 32:12, May 1990, pp. 288-290.

Bar Code Print Quality—Guideline, ANSI X3.182-1990, pp. 1-29.

Businessworld, Cigarette firms complain barcode requirement is 'too costly', Nov. 1998.

Codablock F (128), Bar Coding—Symbology Specification—Codablock, ICS International AG, 1993, pp. 1-44.

Dallas Semiconductor Corporation, Book of DS199x Touch Memory Standards, 1992.

Dallas Semiconductor Corporation, Dallas Takes the Memory Out of the Computer, Feb. 1993.

Dallas Semiconductor Corporation, 50 Ways to Touch Memory.

Extended Channel Interpretation (ECI) Assignments, Release 2, ECI Assignments, Aug. 1995, pp. 1-13.

Information processing—8-bit single-byte coded graphic character sets—, Part 1: Latin alphabet No. 1, ISO 8859-1:1987 (E), pp. 1-7.

Information processing-8-bit single-byte coded graphic character sets, Part 4: Latin alphabet No. 4, ISO 8859-4:1988 (E), pp. 1-5.

IPC-2D Symbology Specification, Sep. 7, 1997, pp. 1-7.

International Product Code (IPC)-13 Symbology Specification (preliminary), Version: Sep. 4, 1997, 99.1-10.

International Product Code (IPC)-14 Symbology Specification (preliminary), Version: Sep. 1, 1997, pp. 1-9.

Material Handling Engineering, Going with the Flow: The 1998 Roundtable Report, Dec. 1998.

NN86055595 IBM Technical Disclosure Bulletin, May 1998, vol. 28, Issue 12, p. 5595-5596.

Palmer, R.C., "Symbologies," The Bar Code Book, 2d ed., Chapter 4, Helmers Publishing, Inc., New Hampshire, 1991, pp. 15-59.

Schuessler, Rick, Using Extended Channel Interpretations (ECI's) for International Character Set Standardization, Scan-Tech Proceedings, Chicago, Nov. 1996, pp. 294-305.

The Unicode Standard Worldwide Character Encoding, Version 1, vol. 1, The Unicode Consortium, Addison-Wesley Publishing Company, Inc., Massachusetts, 1991, pp. 1-6, and 340.

Walker, Nathan, "ASCII-based compaction eases bar-code decoder's work," Electronic Design 30(22), 163-166, Oct. 1982.

Wang, "PDF417 Specification," Symbol Technologies, Inc., 1991.

* cited by examiner

SYSTEMS, DEVICES, AND METHODS FOR READING MACHINE-READABLE CHARACTERS AND HUMAN-READABLE CHARACTERS

CROSS-REFERENCE TO RELATED APPLICATION

This application is a division of U.S. patent application Ser. No. 11/687,555, filed Mar. 16, 2007, now pending, which application is incorporated herein by reference in its entirety.

BACKGROUND

1. Field of the Invention

This disclosure generally relates to the field of automatic data collection.

2. Description of the Related Art

A variety of methods exist for tracking and providing information about objects. For example, the automatic identification and data capture (AIDC) field includes a variety of different types of AIDC data carriers and AIDC readers operable to read data encoded in such data carriers. Typical uses for AIDC technologies include, for example, identifying objects, collecting information about those objects, and entering that information into an AIDC system without the need for human intervention. For example, AIDC technologies are useful for managing inventory items that include data carriers (e.g., printed labels) that provide information such as a manufacturer identifier, product identifier, serial number, quantity, price, weight, and size of the inventory item. In some instances, machine-readable symbols (e.g., bar code symbols, area or matrix code symbols, and/or stacked code symbols) carry the encoded data. In other instances, human-readable symbols (e.g., text characters) carry the encoded data.

Commercial acceptance of AIDC technology is dependent on a variety of factors including, for example, cost, durability, versatility, reliability, and capturing accuracy. For example, typical scanning technologies are relatively inexpensive and can automatically capture machine-readable data at very high speeds, with a very high degree of accuracy. Typical scanning technologies for automatically capturing human-readable symbologies, however, are more costly, and usually exhibit much lower capturing accuracies.

The present disclosure is directed to overcoming one or more of the shortcomings set forth above, and provides further related advantages.

BRIEF SUMMARY OF THE INVENTION

In one aspect, the present disclosure is directed to an automatic data collection system. The system includes an image capture subsystem and a processor subsystem. The image capture subsystem is operable to capture images, and the processor subsystem is configured to read a first number of human-readable symbols from an image captured by the image capture subsystem. In some embodiments, the processor subsystem is further configured to read a second number of human-readable symbols from an image captured by the image capture subsystem, and verify information read from the first number of human-readable symbols based on information read from the second number of human-readable symbols.

In another aspect, the present disclosure is directed to an automatic data collection system including an image subsystem and a processor subsystem. The image subsystem is operable to capture images, and the processor subsystem is configured to decode machine-readable symbols, in a machine-readable symbol reading mode, on an image captured by the image capture system. The processor subsystem is further configured to perform optical character recognition on human-readable symbols in a human-readable symbol reading mode, and to automatically switch from the machine-readable symbol reading mode to the optical character recognition mode in response to information encoded in a machine-readable symbol captured in an image by the image system.

In another aspect, the present disclosure is directed to a method of operating an automatic data collection device. The method includes reading a machine-readable symbol, determining a location of a first number of human-readable symbols and determining a location of a second number of human-readable symbols from information encoded in the machine-readable symbol. In some embodiments, the second number of human-readable symbols is spaced from the first number of human-readable symbols. The method further includes reading the first number of human-readable symbols and reading the second number of human-readable symbols. In some embodiments, the method further includes verifying information contained in the first number of human-readable symbols based on information contained in the second number of human-readable symbols.

In another aspect, the present disclosure is directed to a method of automatic data collection from objects bearing at least a machine-readable symbol, a first number of human-readable symbols, and a second number of human-readable symbols spaced from the first number of human-readable symbols. The method includes automatically reading the first number of human-readable symbols and automatically reading the second number of human-readable symbols. The method further includes verifying information read from the first number of human-readable symbols based on the information read from the second number of human-readable symbols.

In another aspect, the present disclosure is directed to a method of automatic data collection including reading a machine-readable symbol and automatically changing from a machine-readable symbol reading mode to a character recognition mode in response to information encoded in the machine-readable symbol.

In another aspect, the present disclosure is directed to a printer system. The printer system includes a controller subsystem and a printer head. The controller subsystem converts a plurality of machine-readable symbology codes to a machine-readable symbol, converts a plurality of human-readable symbology codes to a first number of human-readable symbols, and converts a plurality of human-readable symbology codes to a second number of human-readable symbols. The print head is communicatively coupled to the controller subsystem, and is operable to print at least the machine-readable symbol, and the first and second number of human-readable symbols.

In another aspect, the present disclosure is directed to a method of automatically marking objects. The method includes automatically determining a number of error detection and/or correction values based on a first number of human-readable symbols to be marked on an object at a first location, and automatically determining a second number of human-readable symbols indicative of the determined error detection and/or correction values to be marked on an object at a second location. The method further includes automatically determining a number of machine-readable symbol characters to be marked on the object at a third location. In some embodiments, the machine-readable symbol characters encode information indicative of the first location and the second location. In some embodiments, the method includes marking the object with each of the machine-readable symbol, the first number of human-readable symbols and the second number of human-readable symbols.

In yet another aspect, the present disclosure is directed to a method of operation for a data collection. The method includes reading a machine-readable symbol, and automatically changing from a machine-readable symbol mode to a character recognition mode in response to information encoded in the read machine-readable symbol. The method further includes automatically reading a first number of human-readable symbols at a first location identified by information encoded in the read machine-readable symbol, and verifying information encoded by the first number of human-readable symbols based at least in part on information encoded in the read machine-readable symbol.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements, as drawn, are not intended to convey any information regarding the actual shape of the particular elements, and have been solely selected for ease of recognition in the drawings.

DETAILED DESCRIPTION OF THE INVENTION

In the following description, certain specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with automatic data collection devices including but not limited to voltage and/or current regulators have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "in another embodiment" means that a particular referent feature, structure, or characteristic described in connection with the embodiment is included in at least one embodiment. Thus, the appearance of the phrases "in one embodiment," or "in an embodiment," or "in another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to an automatic data collection system including "an image capture subsystem" includes a single image capture subsystem, or two or more image capture subsystems. It should also be noted that the term "or" is generally employed in its sense including "and/or" unless the content clearly dictates otherwise.

Automatic data collection (ADC) sometimes known as automatic identification and data capture (AIDC) encompasses many technologies including, for example, charged coupled device (CCD) scanners, contact image sensor (CIS) scanners, laser scanners, wand scanners, triggered laser scanners, hands free scanners, optical character recognition (OCR) systems, pick-to-light systems, radio frequency identification (RFID) systems, radio frequency (RF) terminals, hand-held batch terminals, vehicle-mounted computers, voice systems (e.g., speech-based systems, speech recognition systems), wearable computers, decoders, wedges, as well as bar codes, RFID tags, magnetic stripes, smart cards, and the like.

Figure 1:
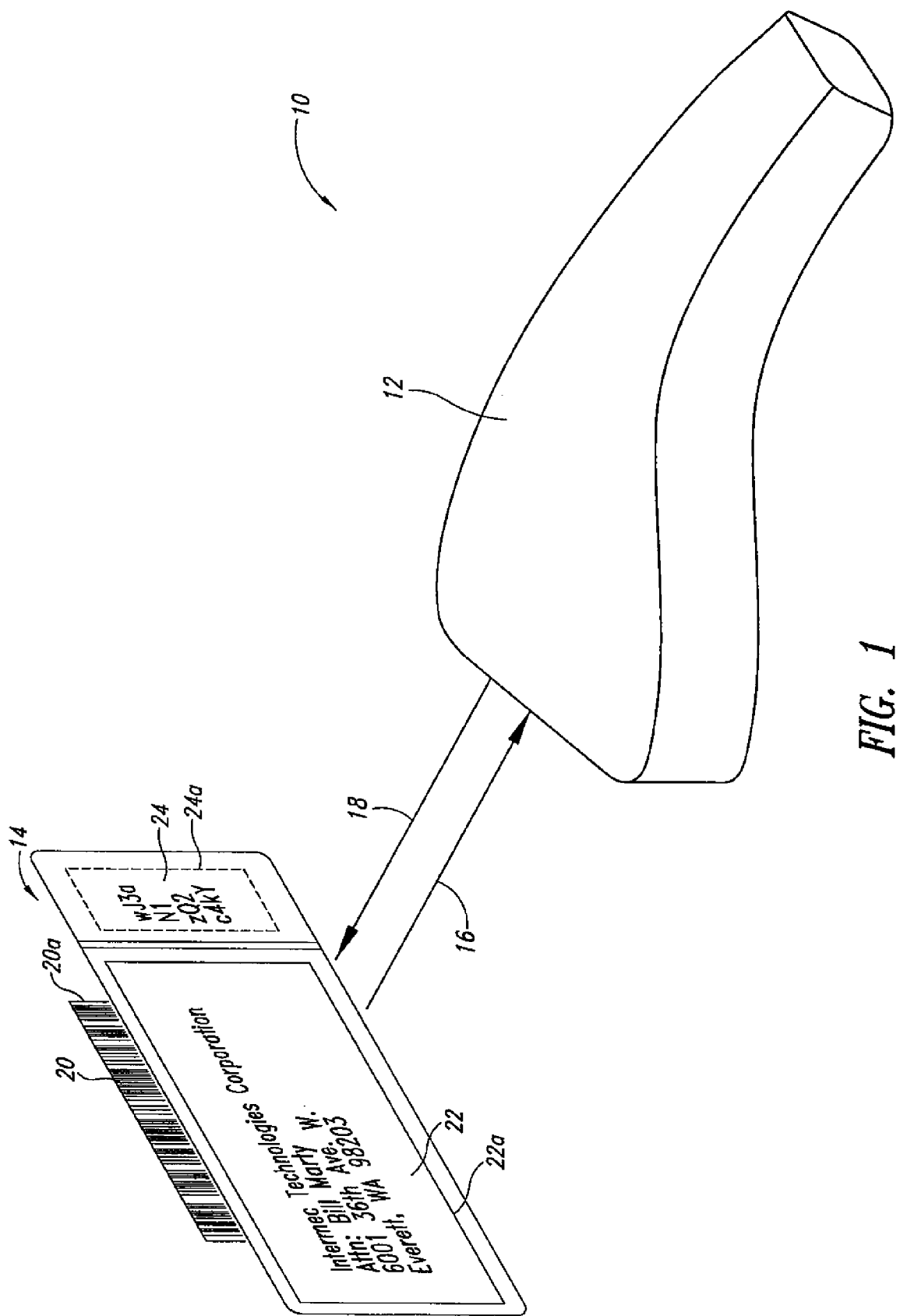
FIG. 1 is an isometric view of an automatic data collection system according to one illustrated embodiment.

FIG. 1 shows an exemplary automatic data collection system 10 including a data collection device 12. When properly positioned, the data collection device 12 is operable to, for example, read, capture, image, and/or scan, and the like, a plurality of symbols 14.

To read the plurality of symbols 14, the data collection device 12 typically captures light 16 reflected or otherwise returned from the plurality of symbols 14. The automatic data collection system 10 may rely on ambient light as the source of the returned light 16, or may include a light system 18 (e.g., a source of electromagnetic radiation in the visible, infrared, ultra-violet portions of the electromagnetic spectrum, and the like) to illuminate the plurality of symbols 14. For example, the data collection device 12 may include a low-energy laser light beam as a source of illumination. In some embodiments, the data collection device 12 includes a plurality of high-intensity light-emitting diodes (LEDs) arranged to simultaneously flood the plurality of symbols 14 with light 18. The data collection device 12 generally captures the reflected or returned light 16, converts the captured light to a digital signal, and decodes the signal according to one or more decoding schemes. The decoding schemes may include machine-readable symbol decoding schemes to convert the machine-readable symbology characters into corresponding machine-readable symbology codes. The decoding schemes may also include human-readable symbol decoding schemes (e.g., optical character recognition or OCR) to convert the read human-readable symbology characters into corresponding machine-editable symbology codes.

Examples of the data collection device 12 include laser scanners, optical reading devices, hand-held scanning devices, bar code scanners or imagers, optical character recognition scanners, or combinations thereof, or other suitable electronic devices having the various data reading and/or writing capabilities described herein and further including the capability for communicating with or otherwise cooperating with a control subsystem to identify a location of an object or objects of interest on which the plurality of symbols 14 are affixed, as will be described in further detail below.

In some embodiments, the data collection system 10 is operable to read multiple data types included in the data carriers. For example, the data collection device 12 may include machine-readable symbol reading components and character recognition components. The machine-readable symbol reading components of the data collection device 12, for example, for reading a barcode symbol can comprise a light source (such as a laser 68) to provide a scanning beam and a photosensor 80 (e.g., photo detector) to detect the returned light 16 from the barcode symbol. The data collection device 12 can employ suitable optics such as lens, prisms, and/or mirrors 70, controlled by a motor controller, for directing modulated light 16 returned from the barcode symbol to the photo detector. Alternatively or additionally, the lens, prisms and/or mirrors 70 and motor controller can be used for directing the scanning beam from the laser 68 to the target barcode symbol. An analog-to-digital (A/D) converter 82 transforms the analog electrical signals from the photosensor 80 into digital signals for use by the microprocessor 54a. The bus 64 couples the digital data from the A/D converter 82 to the microprocessor 54a and the RAM 58.

The human-readable symbol reading components of the data collection device 12 for reading, for example, text characters may include a control subsystem 50 and a photosensor 80 in the form of one or more charge coupled devices, complementary metal-oxide-semiconductors (CMOS), or photodiode image sensors including, for example, one- or two-dimensional photodiode arrays. Typically, the human-readable symbols are captured as images and translated into machine-editable text, or decoded into pictures of characters into a standard encoding scheme representing them.

Many alternatives for image sensors, symbol decoders, and optical elements that can be used in the data collection device 12 are known. Useful embodiments can also be derived from the various components disclosed in U.S. Pat. Nos. 6,286,763 (issued Sep. 11, 2001), 6,003,775 (issued Dec. 21, 1999), 5,659,431 (issued Aug. 19, 1997), and 5,536,924 (issued Jul. 16, 1996), all four assigned to the same assignee as the present application.

Figure 2A:
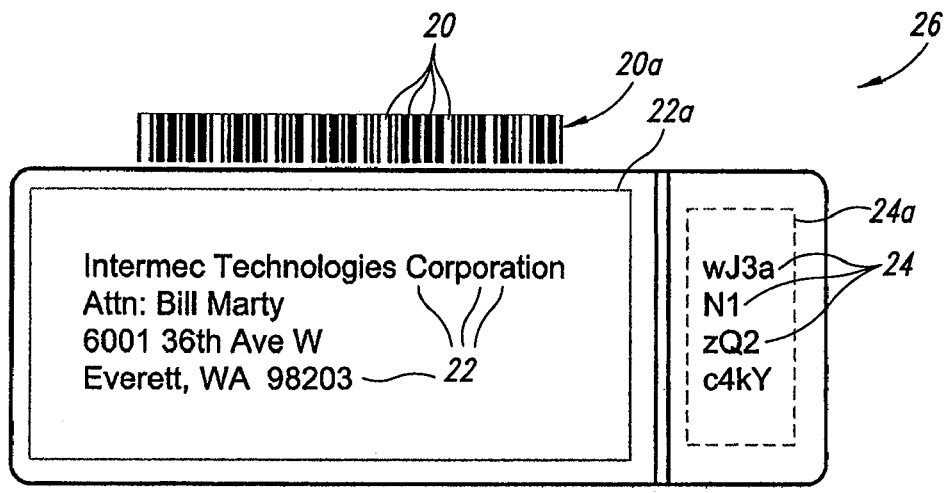
FIG. 2A is a top plan view of a printed label including a plurality of symbols in the form of a machine-readable symbol and a first and second number of human-readable symbols according to one illustrated embodiment.
Figure 2B:
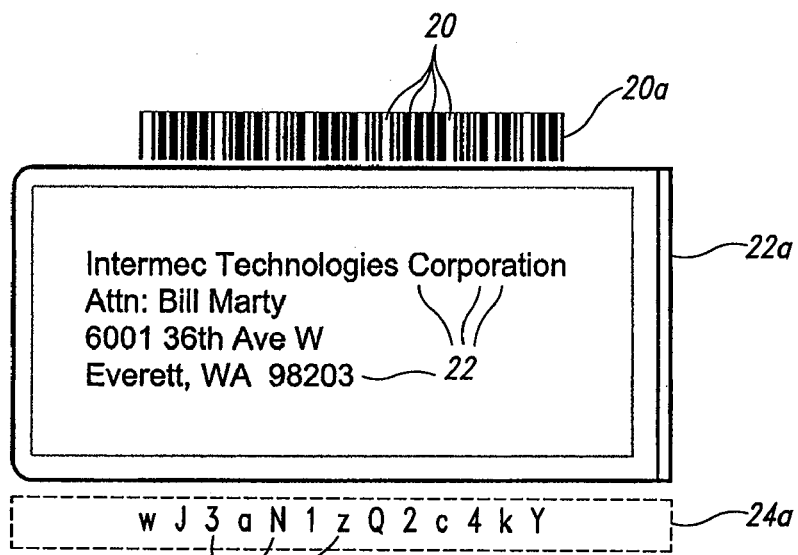
FIG. 2B is a top plan view of a printed label including a plurality of symbols in the form of a machine-readable symbol and a first and second number of human-readable symbols according to another illustrated embodiment.
Figure 2C:
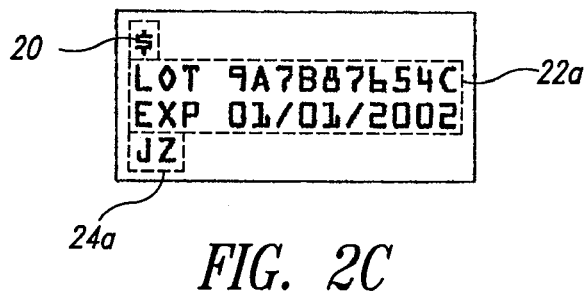
FIG. 2C is a top plan view of a printed label including a plurality of symbols in the form of a machine-readable symbol and a first and second number of human-readable symbols according to another illustrated embodiment.

Referring to FIGS. 2A-2C, the plurality of symbols 14 may be carried by a tag, a label, a printed substrate, a printed tag, a printed label, and the like, and may comprise at least a machine-readable symbol 20, a first number of human-readable symbols 22, and a second number of human-readable symbols 24. The second number of human-readable symbols 24 is typically spaced from the first number of human-readable symbols 22. In some embodiments, the first number of human-readable symbols 22 is located at first location 22a, the second number of human-readable symbols 24 is located at a second location 24a, and the machine-readable symbol 20 is located at a third location 20a. In some embodiments, the second number of human-readable symbols 24 can be located above or below the location 20a of the machine-readable symbol 20. In some embodiments, the second number of human-readable symbols 24 can be located above or below the location 22a of the first number of human-readable symbols 20.

The term "machine-readable" generally refers to information encoded in a form that can be, for example, read, captured, scanned, sensed, and/or imaged by a machine and/or computer and interpreted by the machine's hardware and/or software systems but is difficult or impossible for humans to read naturally. Examples of machine-readable symbols include one-dimensional symbologies, two-dimensional symbologies, multi-dimensional symbologies, stacked symbologies, two-width symbologies, multiple-width symbologies, fixed-length symbologies, variable-length symbologies, discrete symbologies, continuous symbologies, and the like. Further examples of the machine-readable symbol include APOSTAL, CODE 128, CODE 39, CODE 49, CODE 93, CODE 931, CODE ONE, CODEABAR, DATA MATRIX, MAXICODE, PDF417, CODABAR, CODE 25, CODE 39 FULL ASCII, CODE 39 HIBC, CODE 11, EAN-13, EAN-8, EAN supplements, ISBN/BOOKLAND, ITF25, MSI/PLESSEY, POSTNET, UCC/EAN-128, UPC/EAN, UPC-A, UPC-E, UPC supplements, and the like.

The term "human-readable" generally refers to a representation of information that can be naturally read by humans. Examples of the human-readable symbols includes human-readable symbols from an alphabet selected from the group including English, Cyrillic, Greek, Hebrew, Chinese, Kanji, Arabic, Farsi, and the like. Further examples of the human-readable symbols include optical character recognition fonts, OCR-A OCR-B, OCRA I, OCRA III, OCRA IV, OCRB I, OCRB III, and OCRB IV, and the like. The illustrated example shown on FIG. 2A includes a machine-readable symbol 20 formed by a plurality of bar code characters, a plurality of human-readable text characters 22, and a plurality of human-readable text check characters 24. In some embodiments, the human-readable text check characters 24 are associated with the human-readable text characters 22, and are used to check the reading accuracy of the plurality of human-readable text characters 22 based on a variety of error correction and/or error detection techniques.

Figure 3:
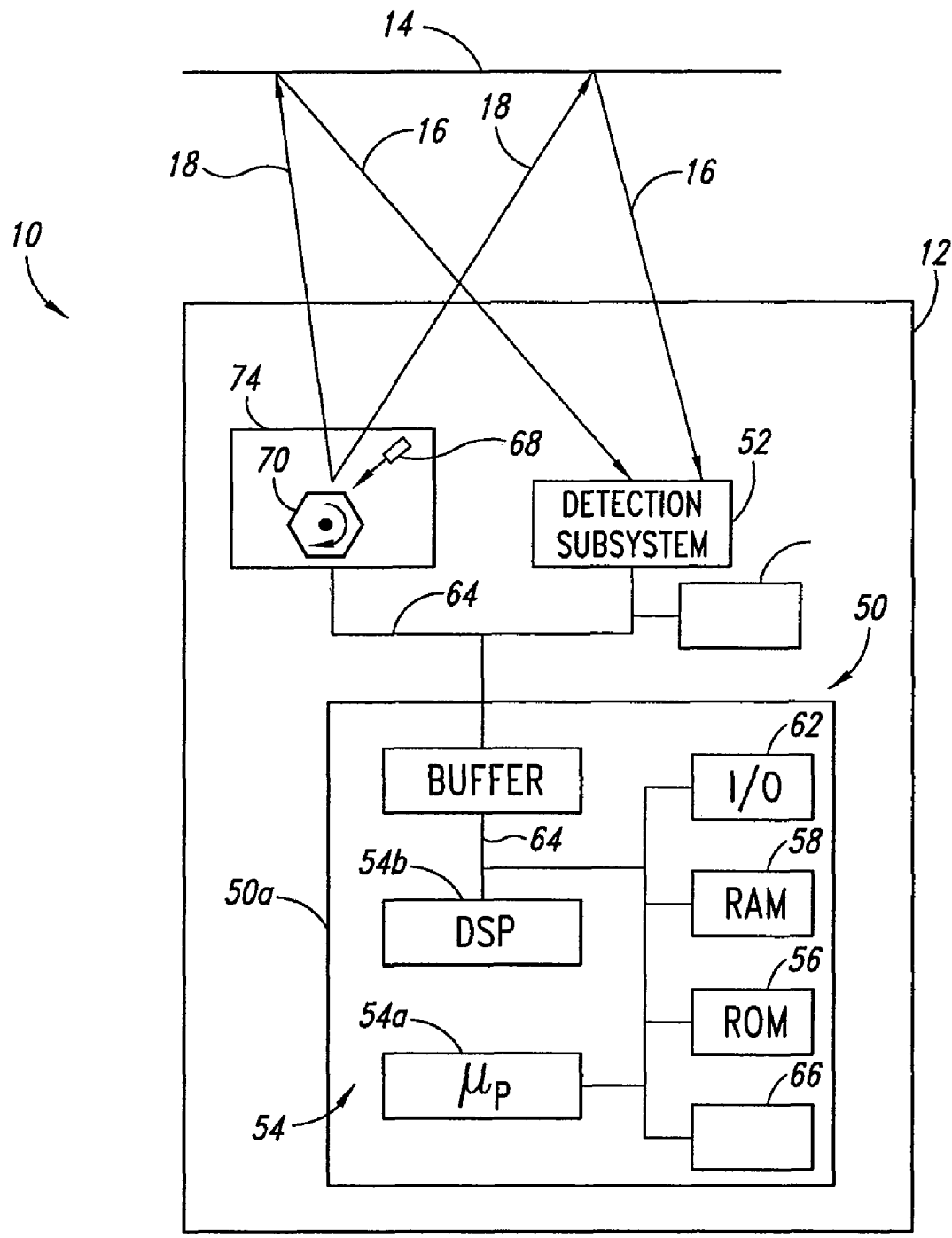
FIG. 3 is a functional block diagram of an automatic data collection system for reading a machine-readable symbol and a first and second number of human-readable symbols according to one illustrated embodiment.

As shown in FIG. 3, the automatic data collection system 10 may further include a control subsystem 50, a detection subsystem 52, and an optional illumination subsystem 74.

The control subsystem 50 may include one or more controllers 54 such as a microprocessor 54a, a digital signal processor (DSP) 54b, an application-specific integrated circuit (ASIC) (not shown), field programmable gate array (FPGA) (not shown) and the like. The control subsystem 50 may also include one or more memories, for example, read-only memory (ROM) 56, random access memory (RAM) 58, and the like, coupled to the controllers 54 by one or more busses 64. The control subsystem 50 may further include one or more input devices 62 (e.g., a display, a touch-screen display, a keyboard, and the like). The control subsystem 50 may also include discrete and/or integrated circuit elements 66 to control the voltage, current, and/or power. For example, the control subsystem 50 may include a diode to provide a constant current to an electrically powered data collection system 10. In some embodiments, the control subsystem 50 may include a rectifying circuit element to provide a direct current voltage and/or a voltage/current regulator. In other embodiments, the control subsystem 50 sinks and sources voltage to maintain a steady state operation of an electrically powered data collection system 10.

The control subsystem 50 may further include logic for controlling the operation of the detection subsystem 52 and the optional illumination subsystem 74. For example, the control subsystem 50 may further include logic for changing from a machine-readable symbol mode to a character recognition mode in response to information encoded in a machine-readable symbol 20.

The control subsystem 50 may also include logic for processing signals from the detection subsystem 52 for reading the plurality of symbols 14. While illustrated as having a single bus 64, the automatic data collection system 10 may include more than one bus. For example, separate buses may be provided for power, control, and data collection. The data collection system 10 may take a handheld form, and may have power supplied from a primary cell, a secondary cell, a battery, an ultra-capacitor, a fuel cell, or other portable power source. In some embodiments, the control subsystem 50 is configured to change the automatic data collection system 10 from a machine-readable symbol reading mode to an optical character recognition mode, and back, in response to information encoded in a machine-readable symbol that forms part of the plurality of symbols 14.

In some embodiments, the control subsystem 50 takes the form of a processor subsystem 50a configured to decode a machine-readable symbol acquired by the image subsystem 52. For example, when the data collection device 12 is passed over a plurality of symbols 14 including at least one bar code symbol, the ambient light and/or the light 18 from the data collection device 12 is absorbed by a series of dark bars, but it is reflected by one or more light spaces. The detection subsystem 52 in the data collection device 12 receives the reflected light 16 and converts the light 16 into an electrical signal. The electric signal is decoded to reveal machine-readable symbology codes representative of the at least one bar code symbol.

The processor subsystem 50a may be further configured to determine a location 22a of a first number of human-readable symbols 22 from information encoded in the machine-readable symbol 20, and determine a location 24b of a second number of human-readable symbols 24 from information encoded in the machine-readable symbol 20. In some embodiments, the second number of human-readable symbols 24 is spaced from the first number of human-readable symbols 22.

In some embodiments, the processor subsystem 50a is configured to read the first number of human-readable symbols 22 at the first location 22a, read the second number of human-readable symbols 24 at the second location 24a, and verify information read from the first number of human-readable symbols 22 based at least in part on information read from the second number of human-readable symbols 24. Verifying information read from the first number of human-readable symbols 22 may include, for example, performing error detection and/or error correction on the information read from the first number of human-readable symbols 22 using error detection and/or correction information encoded in the second number of human-readable symbols 24.

The processor subsystem 50a may include a processor 54a operable to execute instructions and a memory that stores instructions that causes the processor 54a to verify information read from the first number of human-readable symbols 22, based at least in part on information read from the second number of human-readable symbols 24, by performing error detection and/or error correction on the information read from the first number of human-readable symbols 22 using error detection and/or error correction information encoded in the second number of human-readable symbols 24. Exemplary error detection techniques include, for example, repetition schemes, parity check schemes (e.g., single bit, horizontal and vertical redundancy check, and the like), cyclic redundancy check (CRC) schemes, and the like. Exemplary error correction techniques include check digit methods, redundancy check methods, as well as methods employing Hamming code, Reed-Solomon code, Reed-Solomon error correction based on finite fields (e.g., Galois fields (GFs), and the like), Reed-Muller code, binary Golay code, convolutional code, turbo code, and the like.

In some embodiments, the error correction technique comprises Reed-Solomon error correction code based on a Galois field GF (q) having a finite field with q elements including, for example, GF (37), GF (41), GF (53), and the like. In some embodiments, the error correction technique comprises Reed-Solomon error correction code based on a Galois field GF (pn) where p represents the prime modulus and n is an integer greater than or equal to 1. In some embodiments, p is a prime number selected from 2, 3, 5, 7, and the like. In some further embodiments, the error correction technique comprises Reed-Solomon error correction code based on GF (41) with a prime modulus of seven (7) including the elements in table 1.

TABLE 1

| GF (41) WITH A PRIME MODULUS OF 7 | | | | | | | | | | | |
|---|---|---|---|---|---|---|---|---|---|---|---|
| 1  | 7  | 2  | 8  | 3  | 15 | 4  | 23 | 5  | 38 | 6  | 20 |
| 7  | 17 | 8  | 37 | 9  | 13 | 10 | 9  | 11 | 22 | 12 | 31 |
| 13 | 12 | 14 | 2  | 15 | 14 | 16 | 16 | 17 | 30 | 18 | 5  |
| 19 | 35 | 20 | 40 | 21 | 34 | 22 | 33 | 23 | 26 | 24 | 18 |
| 25 | 3  | 26 | 21 | 27 | 24 | 28 | 4  | 29 | 28 | 30 | 32 |
| 31 | 19 | 32 | 10 | 33 | 29 | 34 | 39 | 35 | 27 | 36 | 25 |
| 37 | 11 | 38 | 36 | 39 | 6  | 40 | 1  |    |    |    |    |

The processor subsystem 50a may be configured to read the first and second number of human-readable symbols 22, 24 by performing optical character recognition (OCR). In some other embodiments, the processor subsystem 50a is configured to decode machine-readable symbols 20 in a machine-readable symbol reading mode, and may be further configured to perform optical character recognition on human-readable symbols 22, 24, in a human-readable symbol reading mode. In some embodiments, the processor subsystem 50a is configured to automatically switch from the machine-readable symbol reading mode to the optical character recognition mode in response to information encoded in a machine-readable symbol 20 captured in an image by the image capture system 52. In some other embodiments, the processor subsystem 50a is configured to determine a location 22a of a first number of human-readable symbols 22 from information encoded in the machine-readable symbol 20, and to read the first number of human-readable symbols 22 from the location 22a.

The processor subsystem is further configured to determine a location 24a of a second number of human-readable symbols 24 from information encoded in the machine-readable symbol 20, and to read the second number of human-readable symbols 24. In some embodiments, the location 24a of the second number of human-readable symbols 24 is spaced from the location 22a of the first number of human-readable symbols 22. The processor subsystem 50a may be further configured to verify information read from the first number of human-readable symbols 22 based at least in part on information read from the second number of human-readable symbols 24. In some embodiments, the processor subsystem performs error correction on the information read from the first number of human-readable symbols 22 using error correction information encoded in the second number of human-readable symbols 24.

The processor subsystem 50a may be configured to determine a location 22a in an image of a first number of human-readable symbols 22 from information encoded in the machine-readable symbol 20, and to determine a location 24a of a second number of human-readable symbols 24 in the image from information encoded in the machine-readable symbol 20. In some embodiments, the processor subsystem 50a is configured to determine a location 22a, in an image, of a first number of human-readable symbols 22 with respect to the machine-readable symbol 20 from information encoded in the machine-readable symbol 20, and to determine a location 24a, in the image, of a second number of human-readable symbols 24 with respect to the machine-readable symbol 20 from information encoded in the machine-readable symbol 20.

In some embodiments, the processor subsystem 50a is configured to verify and/or perform error correction on the information read from the first number of human-readable symbols 22 using error correction information encoded in the second number of human-readable symbols 24. In some further embodiments, the processor subsystem 50a is configured to verify and/or perform error correction on the information read from the first number of human-readable symbols 22 using error correction information encoded in the machine-readable symbols 20.

Figure 4:
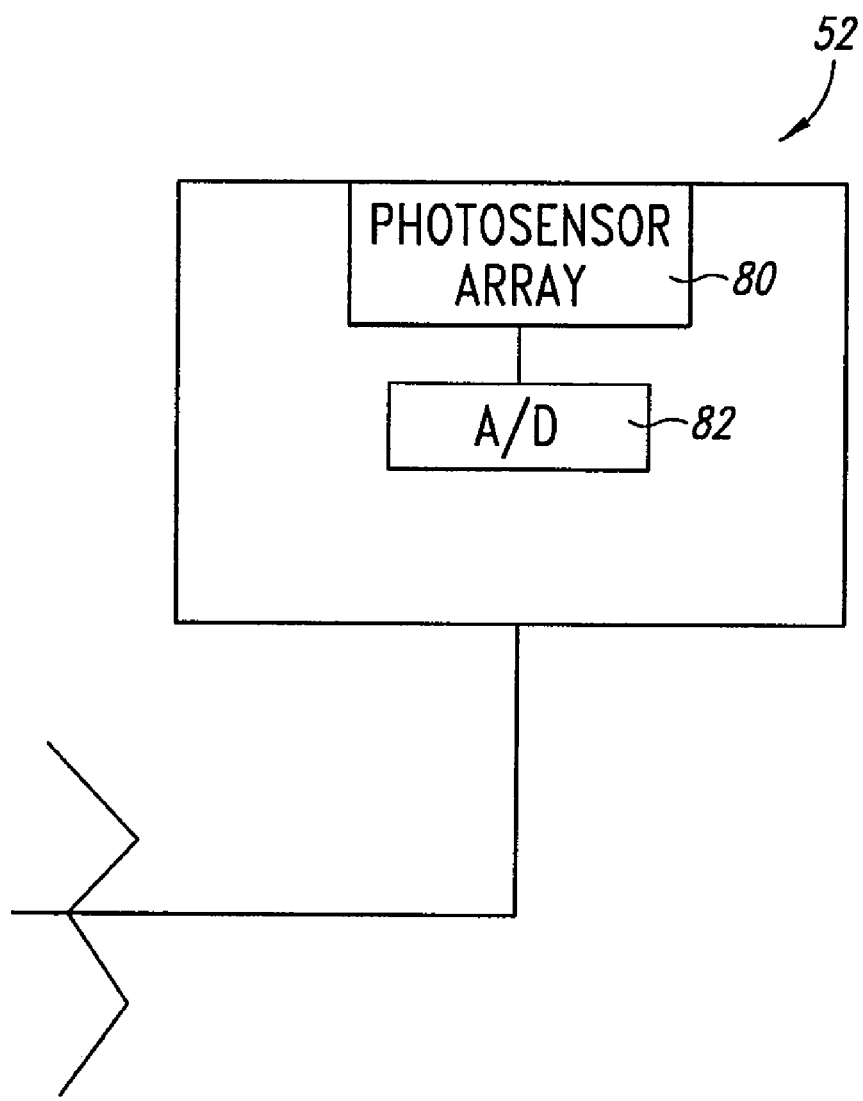
FIG. 4 is a functional block diagram of a detection subsystem of an automatic data collection system for reading a machine-readable symbol and a first and second number of human-readable symbols according to one illustrated embodiment.

The detection subsystem 52 receives the light 16, which includes light returned from the plurality of symbols 14, and generates a signal (e.g., an analog signal, a digital signal, and the like) indicative of the received light 16. The detection subsystem 52 may provide the control subsystem 50 with the signal via bus 64. In some embodiments, the detection subsystem 52 takes the form of an image subsystem, an image capture subsystem, or an image-sensing device, and the like, or combinations thereof. For example, as shown in FIG. 4, the detection subsystem 52 may include a photosensor array 80 in the form of, for example, a two-dimensional image capture device. Examples of two-dimensional image capture devices include one or more charge-coupled device (CCD) arrays, photodiode arrays, charge-injection device arrays, and the like, or combinations thereof.

In some embodiments, the photosensor array 80 produces an analog electrical signal that corresponds to the captured reflected light 16 reflected from the plurality of symbols 14. The detection subsystem 52 may further include an analog-to-digital (A/D) converter 82 to convert the analog signal into digital image data representative of the plurality of symbols 14.

The illumination subsystem 74 is configured to emit light 18 in response to a triggering command from the control subsystem 50. The illumination subsystem 74 receives the triggering command via the bus 64. In some embodiments, the illumination subsystem 74 is configured to emit light 18 as a beam. The control subsystem 50 may additionally control, among other things, the direction of the beam from the illumination subsystem 74 and the rate of scan of the beam. The illumination subsystem 74 may include a light source such as laser diode 68, and a movable reflector such as a multi-faceted prism 70 mounted to rotate about an axis to scan the beam of light 18 across a target, such as the plurality of symbols 14.

Figure 5:
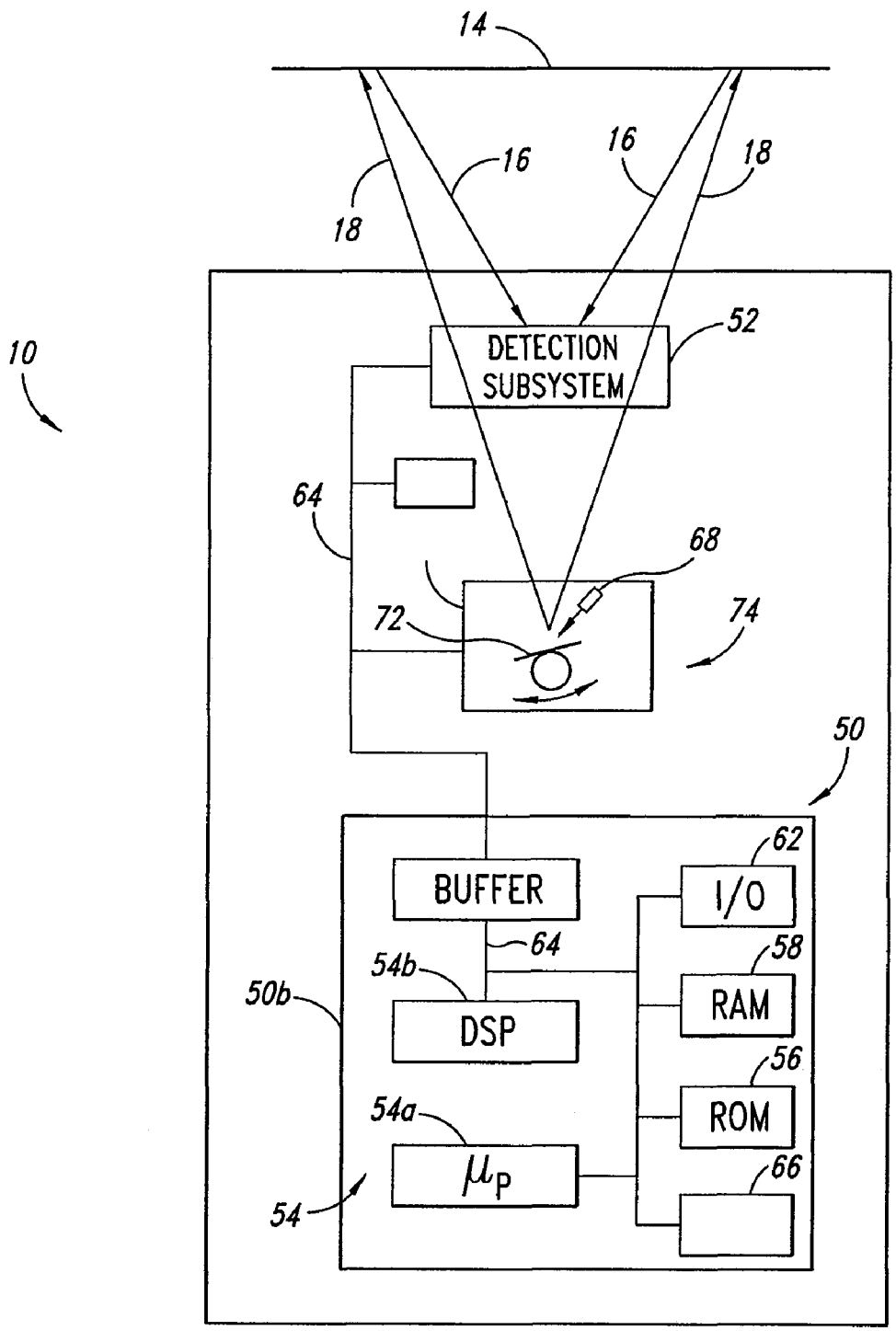
FIG. 5 is a functional block diagram of an automatic data collection system for reading a machine-readable symbol and a first and second number of human-readable symbols according to one illustrated embodiment.

FIG. 5 shows another exemplary embodiment of the data collection system 10 for reading the plurality of symbols 14 according to one illustrated embodiment. The automatic data collection system 10 may include a control subsystem 50, a detection subsystem 52, and an optional illumination subsystem 74.

The illumination subsystem 74 may include a light source, such as a laser diode 68, and a moveable reflector such as a mirror 72 mounted to oscillate about an axis to scan the beam of light 18 across a target, such as the plurality of symbols 14.

The detector subsystem 52 is configured to receive the light 16 returned from of the plurality of symbols 14 and provide the controller subsystem 50 with a signal indicative of the received light 16. In some embodiments, the detector subsystem 52 is configured to allow light 18 from the illumination subsystem 74 to pass through.

Figure 6:
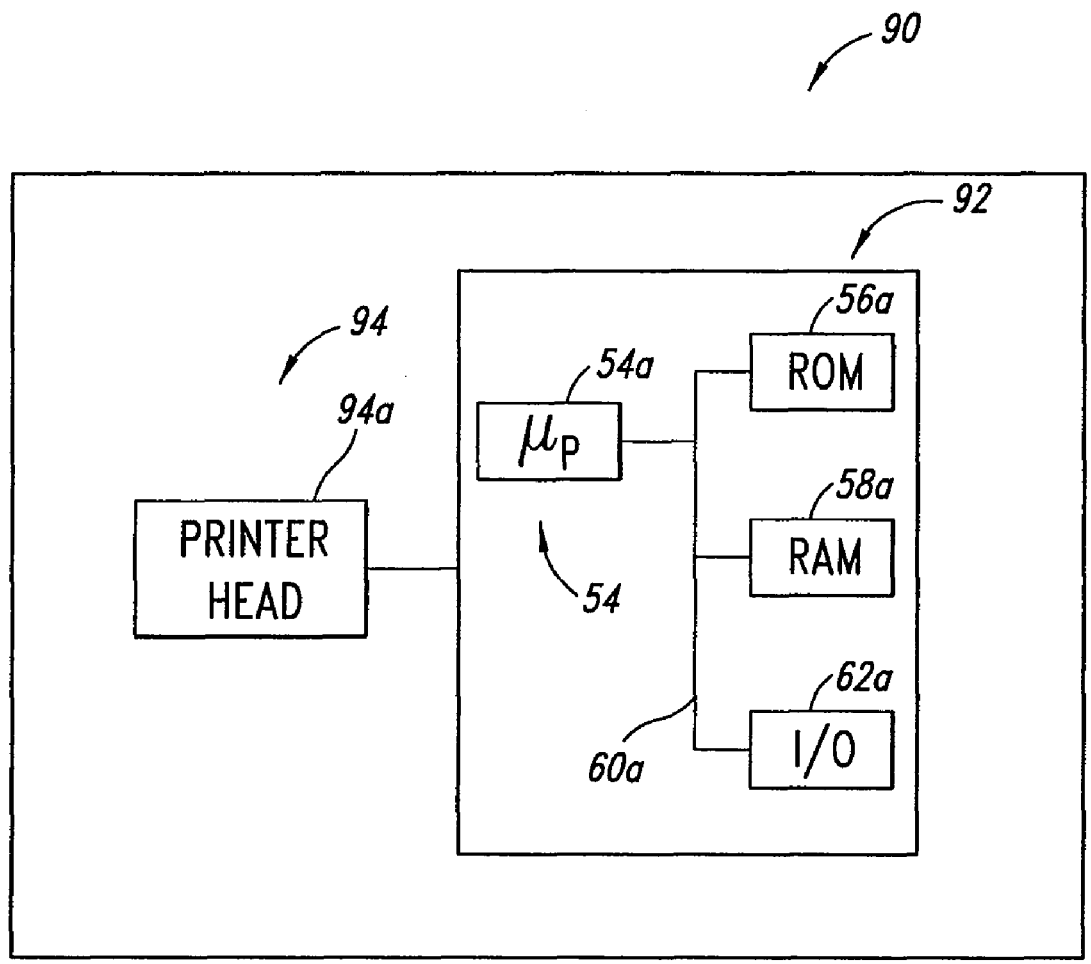
FIG. 6 is a functional block diagram of a printer system for printing a machine-readable symbol and a plurality of human-readable symbols according to one illustrated embodiment.

FIG. 6 shows an exemplary printer system 90 operable to print at least a machine-readable symbol 20 and the first and second number of human-readable symbols 22, 24. The printer system 90 includes a controller subsystem 92 and a print head 94.

The controller subsystem 92 may include one or more controllers 54 such as a microprocessor 54a, a digital signal processor (DSP) (not shown), an application-specific integrated circuit (ASIC) (not shown), field programmable gate array (FPGA) (not shown), and the like. The controller subsystem 92 may also include one or more memories, for example, read-only memory (ROM) 56a random access memory (RAM) 58a, and the like, coupled to the controllers 54a by one or more busses 64a. The controller subsystem 92 may further include one or more input devices 62 (e.g., a display, a touch-screen display, and the like). In some embodiments, the controller subsystem 92 is operable to convert a plurality of machine-readable symbology codes to a machine-readable symbol, as well as operable to convert a plurality of human-readable symbology codes to a first number of human-readable symbols, and a plurality of human-readable symbology codes to a second number of human-readable symbols.

The print head 94a is communicatively coupled to the controller subsystem 96, and operable to print the machine-readable symbol and the first and second number of human-readable symbols 22, 24.

The term "symbology" generally refers to a particular system for encoding information and/or the format of the machine-readable or human-readable representations. Different symbologies comprise different characteristics, such as an encoding efficiency and character set. The character set defines, for example, the number of functional data characters the symbology encodes. For example, certain bar code symbologies include a machine-readable symbol including a series of parallel, adjacent bar and spaces representing start and stop characters, quiet zones, data characters, and check characters that form a complete machine-readable entity.

In some embodiments, the machine-readable symbol includes a number of machine-readable symbol characters from a machine-readable symbology selected from the group consisting of UPC/EAN, PDF417, CODE 39, CODE 49, CODE 93, CODE 93i, CODE 128, CODE ONE, CODEABAR, DATA MATRIX, MAXICODE.

In some embodiments, the first and second number of human-readable symbols 22, 24 include a number of human-readable symbol characters from a human-readable symbology selected from an alphabet selected from the group consisting of English, Cyrillic, Greek, Hebrew, Chinese, Kanji, Arabic, and Farsi.

Figure 7:
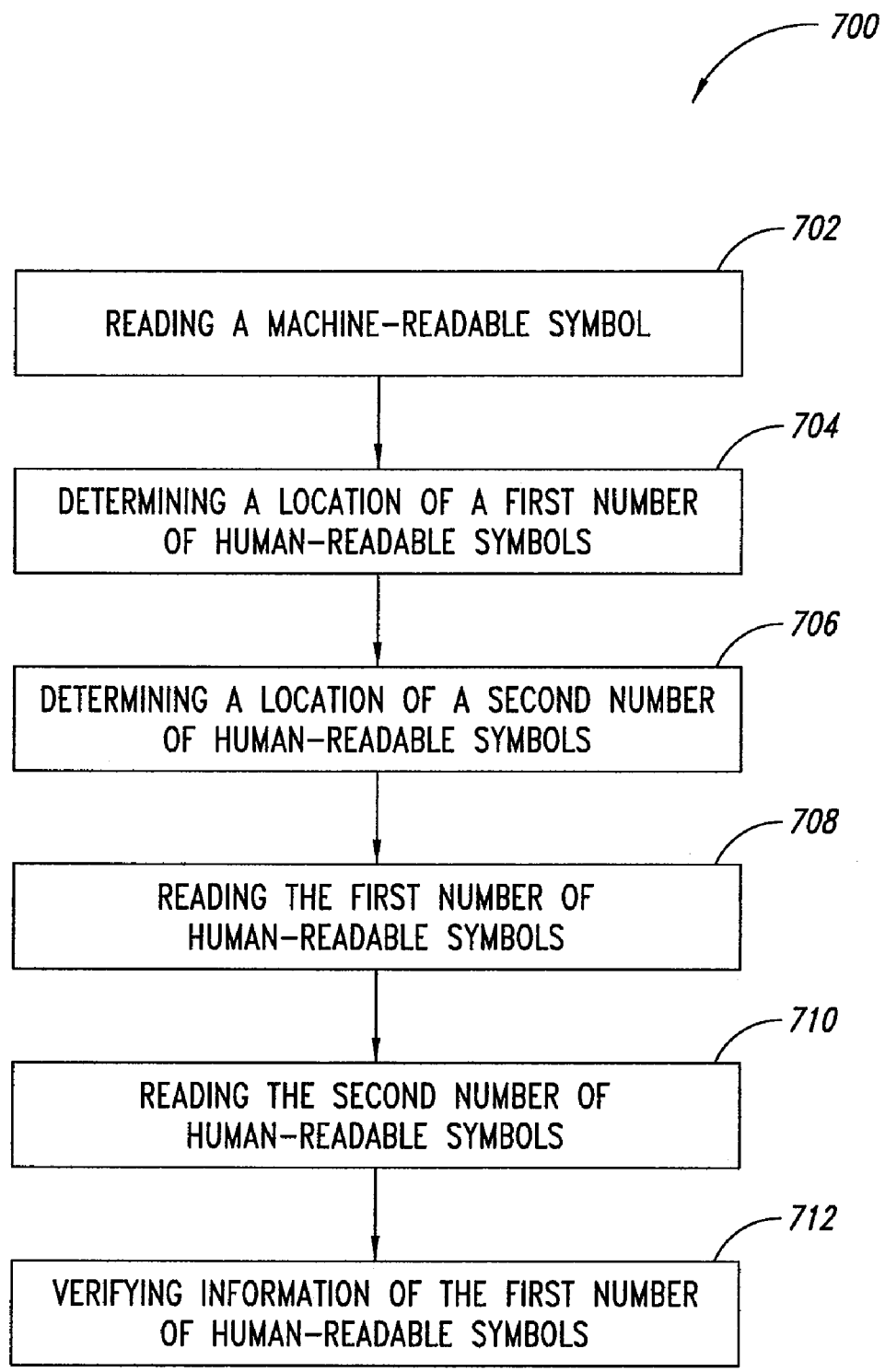
FIG. 7 is a flow diagram showing a method of operating an automatic data collection device according to one illustrated embodiment.

FIG. 7 shows an exemplary method 700 of operating an automatic data collection device.

At 702, the method includes reading a machine-readable symbol 20. In some embodiments, reading the machine-readable symbol 20 includes capturing an image of the machine-readable symbol 20. Reading the machine-readable symbol 20 may further include decoding the machine-readable symbol 20 based on the captured image of the machine-readable symbol 20.

At 704, the method includes determining a location 22a of a first number of human-readable symbols 22 from information encoded in the machine-readable symbol 20.

At 706, the method further includes determining a location 24a of a second number of human-readable symbols 24, which are spaced from the first number of human-readable symbols 22, from information encoded in the machine-readable symbol 20.

At 708, the method includes reading the first number of human-readable symbols 22 and, at 710, the method further includes reading the second number of human-readable symbols 24. In some embodiments, reading the first and second number of human-readable symbols 22, 24 includes capturing an image of the first and second number of human-readable symbols 22, 24. In some further embodiments, reading the first and second number of human-readable symbols 22, 24 includes capturing a respective image of each of the first and second number of human-readable symbols 22, 24.

At 712, the method further includes verifying information contained in the first number of human-readable symbols 22 based at least in part on information contained in the second number of human-readable symbols 24. In some embodiments, the method includes verifying information read from the first number of human-readable symbols 22 based at least in part on information read from the second number of human-readable symbols 24. Verifying information read from the first number of human-readable symbols 22 may include performing error detection and/or correction on the information read from the first number of human-readable symbols 22 using error correction information encoded in the second number of human-readable symbols 24. In some embodiments, verifying information read from the first number of human-readable symbols 22 may include performing error detection and/or correction on the information read from the first number of human-readable symbols 22 using error correction information encoded in the machine-readable symbol 20.

In some embodiments, the method may further include changing from a machine-readable symbol mode to a character recognition mode in response to information encoded in the machine-readable symbol 20. In some embodiments, the method may further include determining a location 22a of the first number of human-readable symbols 22 from information encoded in the machine-readable symbol 20. In yet some further embodiments, the method may include determining a location 24a of the second number of human-readable symbols 24 from information encoded in the machine-readable symbol 20.

Figure 8:
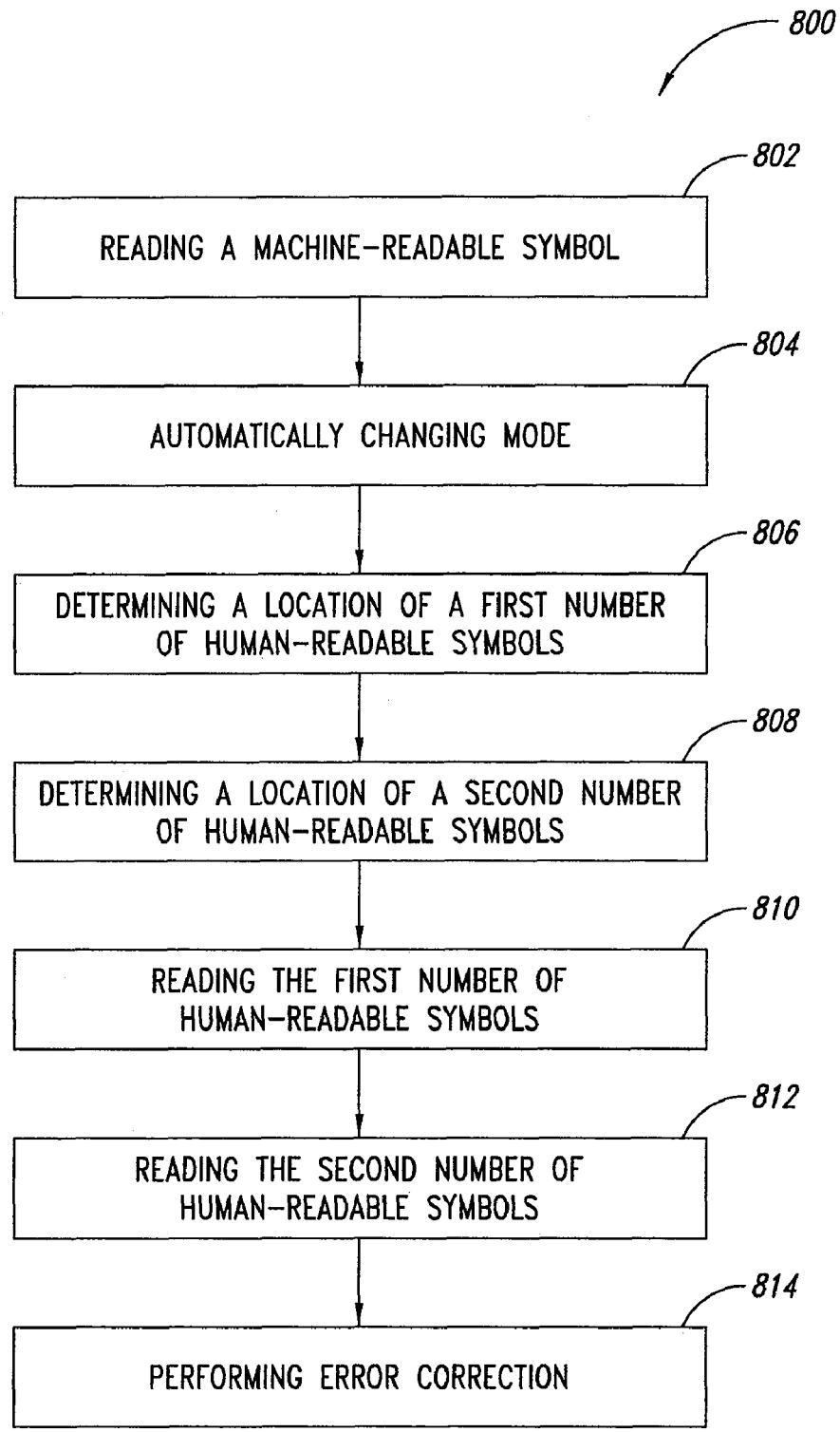
FIG. 8 is a flow diagram showing a method of automatic data collection according to another illustrated embodiment.

FIG. 8 shows an exemplary method 800 of automatic data collection.

At 802, the method includes reading a machine-readable symbol 20.

At 804, the method includes automatically changing from a machine-readable symbol mode to a character recognition mode in response to information encoded in the machine-readable symbol 20.

At 806, the method further includes determining a location 22a of a first number of human-readable symbols 22 from information encoded in the machine-readable symbol 20 and, at 808, the method further includes determining a location 24a of a second number of human-readable symbols 24 from information encoded in the machine-readable symbol 20. In some embodiments, the location 24a of the second number of human-readable symbols is spaced from the location 22a of the first number of human-readable symbols 22.

Determining a location 22a of a first number of human-readable symbols 22 from information encoded in the machine-readable symbol 20 may include determining a location 22a from an image, based on information encoded in the machine-readable symbol 20, that includes the first number of human-readable symbols 22. Likewise, determining a location 24a of a second number of human-readable symbols 24 from information encoded in the machine-readable symbol 20 may include determining a location 24a from an image, based on information encoded in the machine-readable symbol 20, that includes the second number of human-readable symbols 24.

At 810, the method further includes reading the first number of human-readable symbols 22 and, at 812, the method further includes reading the second number of human-readable symbols 24.

At 814, the method further includes performing error detection and/or correction on the information read from the first number of human-readable symbols 22 using error correction information encoded in the second number of human-readable symbols 24. In some embodiments, the method includes verifying information read from the first number of human-readable symbols 22 based at least in part on information read from the second number of human-readable symbols 24.

Figure 9:
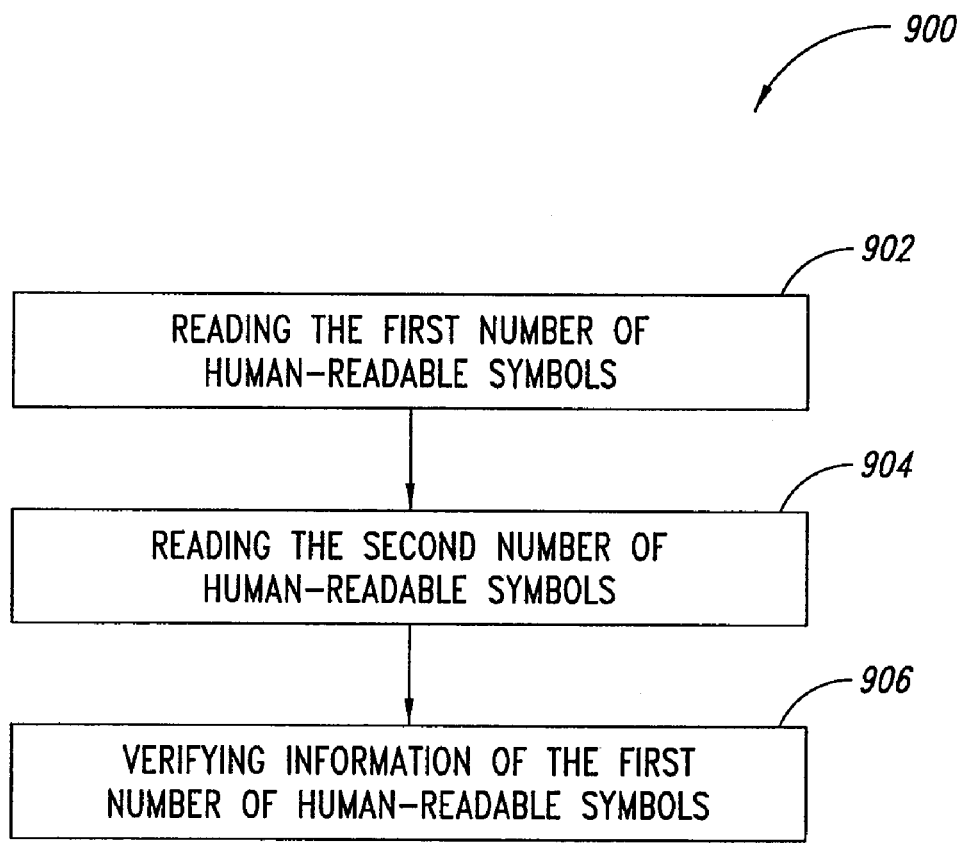
FIG. 9 is a flow diagram showing a method of automatic data collection from objects bearing a machine-readable symbol, a first number of human-readable symbols, and a second number of human-readable symbols spaced from the first number of human-readable symbols according to one illustrated embodiment.

FIG. 9 shows an exemplary method of automatic data collection from objects bearing a machine-readable symbol 20, a first number of human-readable symbols 22, and a second number of human-readable symbols 24 spaced from the first number of human-readable symbols 22.

At 902, the method includes automatically reading the first number of human-readable symbols 22.

At 904, the method includes automatically reading the second human-readable symbols 24.

At 906, the method includes verifying information read from the first number of human-readable symbols 22 based at least in part on information read from the second number of human-readable symbols 24. Verifying the information read from the first number of human-readable symbols 22 based at least in part on information read from the second number of human-readable symbols 24 may include performing error detection and/or correction on the information read from the first number of human-readable symbols 22 using error detection and/or correction information encoded in the second number of human-readable symbols 24.

The method may further include automatically reading the machine-readable symbol 20 before automatically reading the first and second number of human-readable symbols 22, 24, and determining a location 22a of the first number of human-readable symbols 22 from information encoded in the machine-readable symbol 20.

The method may further include automatically reading the machine-readable symbol 20 before automatically reading the first number of human-readable symbols 22, determining a location 22a of the first number of human-readable symbols 22 from the location of the machine-readable symbol 20, and calculating the validity of the information encoded in the machine-readable symbol 20, using character information encoded in the machine-readable symbol 20.

The method may further include automatically changing from a machine-readable symbol mode to a character recognition mode in response to information encoded in the machine-readable symbol 20.

The method may further include determining a location 24a of the second number of human-readable symbols 24 from information encoded in the machine-readable symbol 20. In some embodiments, determining a location 22a of a first number of human-readable symbols 22 from information encoded in the machine-readable symbol 20 includes determining a location 22a of the first number of human-readable symbols 22 in an image captured from the information encoded in the machine-readable symbol 20. Determining a location 24a of a second number of human-readable symbols 24 from information encoded in the machine-readable symbol 20 includes determining a location 24a of the second number of human-readable symbols 24 in the image captured from the information encoded in the machine-readable symbol 20.

Automatically reading the machine-readable symbol 20 may include capturing an image of the machine-readable symbol 20. Reading the machine-readable symbol 20 may also include decoding the machine-readable symbol 20 based on the captured image of the machine-readable symbol 20.

In some embodiments, automatically reading the first and second number of human-readable symbols 22, 24 includes capturing an image of the first and second number of human-readable symbols 22, 24. In some other embodiments, automatically reading the first and second number of human-readable symbols 22, 24 includes capturing a respective image of each of the first and second number of human-readable symbols 22, 24.

Figure 10:
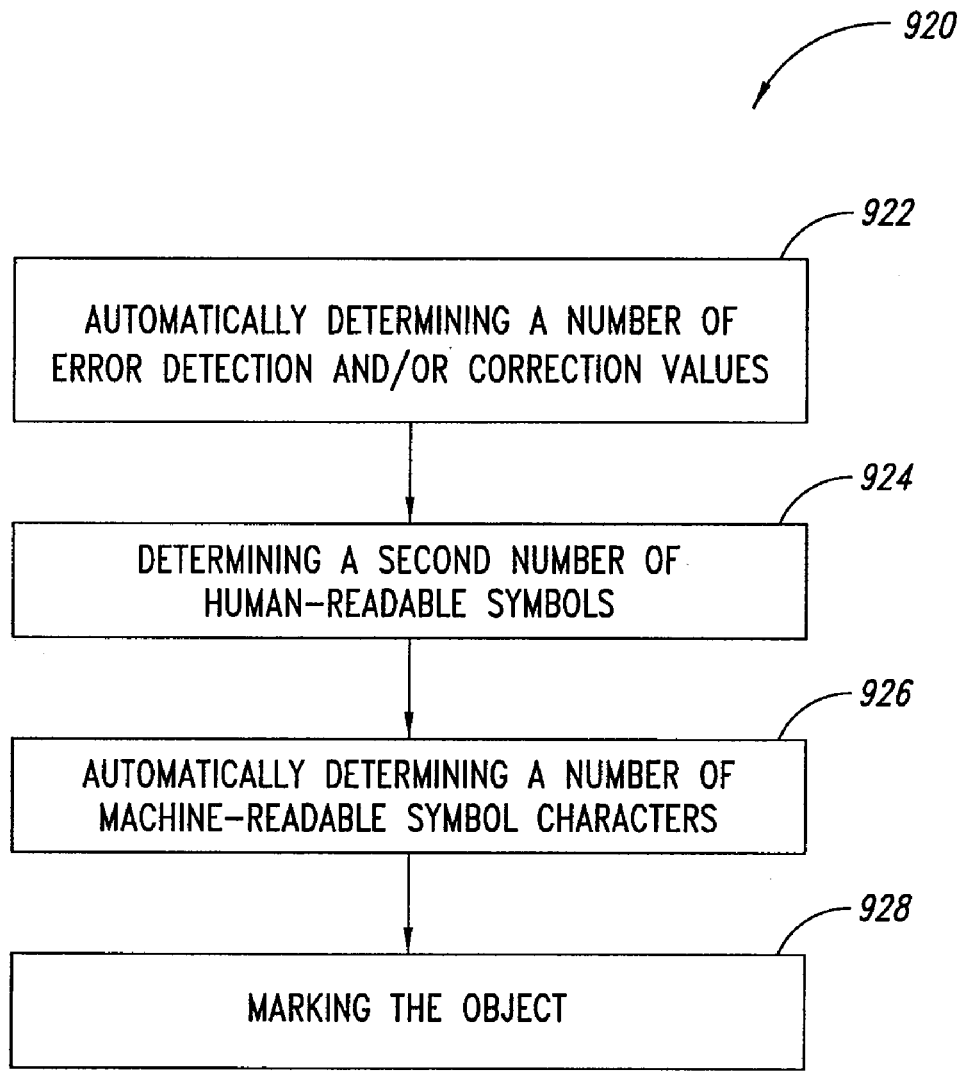
FIG. 10 is a flow diagram showing a method of automatically marking objects according to one illustrated embodiment.

FIG. 10 shows an exemplary method 920 of automatically marking objects 26.

At 922, the method includes automatically determining a number of error detection and/or correction values based on a first number of human-readable symbols 22 to be marked on an object 26 at a first location 22a. In some embodiments, the method may further include receiving an input indicative of the first number of human-readable symbols 22.

At 924, the method includes automatically determining a second number of human-readable symbols 24 indicative of the determined error detection and/or correction values to be marked on an object 26 at a second location 24a.

At 926, the method includes automatically determining a number of machine-readable symbol characters 20 to be marked on the object 26 at a third location 20a. In some embodiments, the machine-readable symbol characters 20 encode information indicative of the first location 22a and the second location 24a.

In some embodiments, automatically determining a number of machine-readable symbol characters 20 to be marked on the object 26 at a third location 20a, includes automatically determining a number of machine-readable symbol characters 20 to be marked on the object 26 at a third location 20a. In some embodiments, the machine-readable symbol characters 20 encode information indicative of the first location 22a and the second location 24a and an instruction to automatically switch an automatic data collection system between a machine-readable symbol reading mode and an optical character recognition mode.

At 928, the method includes marking the object 26 with each of the machine-readable symbol, the first number of human-readable symbols and the second number of human-readable symbols. In some embodiments, marking the object 26 with each of the machine-readable symbol, the first number of human-readable symbols and the second number of human-readable symbols includes printing the first number of human-readable symbols on the object 26 starting at the first location 22a, printing the second number of human-readable symbols on the object 26 starting at the second location 24a, and printing the machine-readable symbol on the object 26 starting at the third location 20a.

Figure 11:
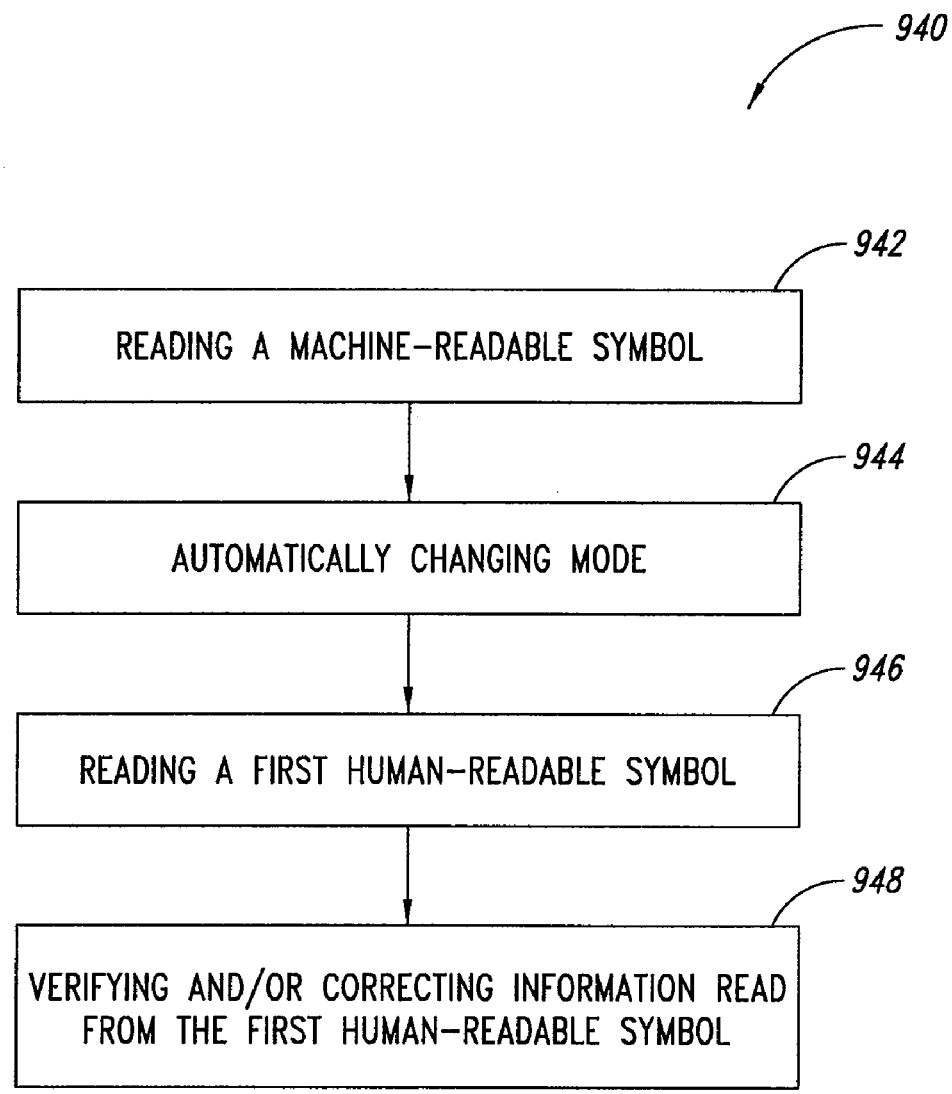
FIG. 11 is a flow diagram showing a method of automatic data collection according to one illustrated embodiment.

FIG. 11 shows an exemplary method 940 of operation for a data collection.

At 942, the method includes reading a machine-readable symbol 20.

At 944, the method includes automatically changing from a machine-readable symbol mode to a character recognition mode in response to information encoded in the read machine-readable symbol.

At 946, the method includes automatically reading a first number of human-readable symbols 22 at a first location 22a identified by information encoded in the read machine-readable symbol 20.

At 948, the method includes verifying information encoded by the first number of human-readable symbols 22 based at least in part on information encoded in the machine-readable symbol 20. In some embodiments, verifying information read from the first number of human-readable symbols 22 based at least in part on information read from the machine-readable symbol 20 includes performing error detection and/or correction on the information read from the first number of human-readable symbols 22 using Reed-Solomon code information encoded in the machine-readable symbol.

In some embodiments, the Reed-Solomon code information is based on a Galois Field (GF) selected from GF (37), GF (41), or GF (53). All of the above U.S. patents, U.S. patent application publications, U.S. patent applications, foreign patents, foreign patent applications and non-patent publications referred to in this specification and/or listed in the Application Data Sheet, including U.S. Pat. No. 6,286,763 (issued Sep. 11, 2001), U.S. Pat. No. 6,003,775 (issued Dec. 21, 1999), U.S. Pat. No. 5,659,431 (issued Aug. 19, 1997), and U.S. Pat. No. 5,536,924 (issued Jul. 16, 1996), are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of operating an automatic data collection system to perform automatic data collection, the method comprising:

reading a machine-readable symbol by the automatic data collection system;

automatically changing the automatic data collection system from a machine-readable symbol mode to a character recognition mode in response to information encoded in the machine-readable symbol;

determining a location of a first number of human-readable characters from information encoded in the machine-readable symbol;

determining a location of a second number of human-readable characters from information encoded in the machine-readable symbol, the location of the second number of human-readable characters spaced from the location of the first number of human-readable characters;

automatically reading the first number of human-readable characters; and automatically reading the second number of human-readable characters; and verifying information read from the first number of human-readable characters based at least in part on information read from the second number of human-readable characters.

2. The method of claim 1 wherein determining a location of a first number of human-readable characters from information encoded in the machine-readable symbol includes determining a location of the first number of human-readable characters in an image from the information encoded in the machine-readable symbol, and wherein determining a location of a second number of human-readable characters from information encoded in the machine-readable symbol includes determining a location of the second number of human-readable characters in the image from the information encoded in the machine-readable symbol.

3. An automatic data collection system, comprising:

an image capture subsystem operable to capture images; and a processor subsystem configured to decode machine-readable symbols in a machine-readable symbol reading mode, to perform optical character recognition on human-readable characters in a human-readable characters reading mode, and to automatically switch from the machine-readable symbol reading mode to the human-readable character reading mode in response to information encoded in a machine-readable symbol captured in an image by the image capture system; to determine a location of a first number of human-readable characters from information encoded in the machine-readable symbol, and to read the first number of human-readable characters from the location; to determine a location of a second number of human-readable characters from information encoded in the machine-readable symbol, the location of the second number of human-readable characters spaced from the location of the first number of human-readable characters, to read the second number of human-readable characters and to verify information read from the first number of human-readable characters based at least in part on information read from the second number of human-readable characters.

4. The automatic data collection system of claim 3 wherein the processor subsystem is further configured to determine a location in an image of a first number of human-readable characters from information encoded in the machine-readable symbol, and to determine a location of a second number of human-readable characters in the image from information encoded in the machine-readable symbol.

5. The automatic data collection system of claim 3 wherein the processor subsystem is further configured to determine a location in an image of a first number of human-readable characters with respect to the machine-readable symbol from information encoded in the machine-readable symbol, and to determine a location in the image of a second number of human-readable characters with respect to the machine-readable symbol from information encoded in the machine-readable symbol, the location of the second number of human-readable characters spaced from the location of the first number of human-readable characters.

6. An automatic data collection system, comprising:

an image capture subsystem operable to capture images; and a processor subsystem configured to decode machine-readable symbols in a machine-readable symbol reading mode, to perform optical character recognition on human-readable characters in a human-readable characters reading mode, and to automatically switch from the machine-readable symbol reading mode to the human-readable character reading mode in response to information encoded in a machine-readable symbol captured in an image by the image capture system; to determine a location of a first number of human-readable characters from information encoded in the machine-readable symbol; to read the first number of human-readable characters from the location; to determine a location of a second number of human-readable characters from information encoded in the machine-readable symbol, the location of the second number of human-readable characters spaced from the location of the first number of human-readable characters, to read the second number of human-readable characters; and to perform error correction on the information read from the first number of human-readable characters using error correction information encoded in the second number of human-readable characters.

7. A method of operation for a data collection system, the method comprising:

reading a machine-readable symbol by the data collection system;

automatically changing the data collection system from a machine-readable symbol mode to a character recognition mode in response to information encoded in the read machine-readable symbol;

automatically reading by the data collection system a first number of human-readable characters at a first location identified by information encoded in the read machine-readable symbol;

automatically reading by the data collection system a second number of human-readable characters at a second location identified by information encoded in the read machine-readable symbol; and verifying by the data collection system information encoded by the first number of human-readable characters based at least in part on information encoded in the machine-readable symbol.

8. The method of claim 7, wherein verifying information read from the first number of human-readable symbols based at least in part on information read from the machine-readable symbol includes performing error detection and/or correction on the information read from the first number of human-readable symbols using Reed-Solomon code information encoded in the machine-readable symbol.

9. The method of claim 8 wherein the Reed-Solomon code information is based on a Galois Field (GF) selected from GF (37), GF (41), or GF (53).

10. A method of operating an automatic data collection system to perform automatic data collection, the method comprising:

reading a machine-readable symbol by the automatic data collection system;

automatically changing the automatic data collection system from a machine-readable symbol mode to a character recognition mode in response to information encoded in the machine-readable symbol;

determining a location of a first number of human-readable characters from information encoded in the machine-readable symbol;

determining a location of a second number of human-readable characters from information encoded in the machine-readable symbol, the location of the second number of human-readable characters spaced from the location of the first number of human-readable characters;

automatically reading the first number of human-readable characters; and automatically reading the second number of human-readable characters; and performing error detection and/or correction on the information read from the first number of human-readable characters using error correction information encoded in the second number of human-readable characters.

11. The method of claim 10 wherein determining a location of a first number of human-readable characters from information encoded in the machine-readable symbol includes determining a location of the first number of human-readable characters in an image from the information encoded in the machine-readable symbol, and wherein determining a location of a second number of human-readable characters from information encoded in the machine-readable symbol includes determining a location of the second number of human-readable characters in the image from the information encoded in the machine-readable symbol.

* * * * *

UNITED STATES PATENT AND TRADEMARK OFFICE
CERTIFICATE OF CORRECTION

PATENT NO. : 7,857,220 B2  
APPLICATION NO. : 12/463947  
DATED : December 28, 2010  
INVENTOR(S) : William A. Marty et al.

Page 1 of 2

It is certified that error appears in the above-identified patent and that said Letters Patent is hereby corrected as shown below:

Item 73
"Intermac IP Corp., Everett, WA (US)" should read, --Intermec IP Corp., Everett, WA (US)--.

Column 15, Lines 14-15, Claim 1
"automatically reading the first number of human-readable characters; and" should read, --automatically reading the first number of human-readable characters;--.

Column 15, Line 44, Claim 3
"an image by the image capture system; to determine a" should read, --an image by the image capture system, to determine a--.

Column 15, Line 48, Claim 3
"characters from the location; to determine a location of a" should read, --characters from the location, to determine a location of a--.

Column 15, Line 54, Claim 3
"of human-readable characters and to verify" should read, --of human-readable characters, and to verify--.

Column 16, Line 16, Claim 6
"reading mode, and to automatically switch from the" should read, --reading mode, to automatically switch from the--.

Column 16, Line 20, Claim 6
"an image by the image capture system; to determine a" should read, --an image by the image capture system, to determine a--.

Signed and Sealed this
Nineteenth Day of June, 2012

David J. Kappos
*Director of the United States Patent and Trademark Office*

CERTIFICATE OF CORRECTION (continued)
U.S. Pat. No. 7,857,220 B2

Column 16, Lines 23-25, Claim 6
"machine-readable symbol; to read the first number of human-readable characters from the location; to determine a location of a" should read, --machine-readable symbol, to read the first number of human-readable characters from the location, to determine a location of a--.

Column 16, Line 30, Claim 6
"of human-readable characters; and to perform error" should read, --of human-readable characters, and to perform error--.

Column 16, Line 56, Claim 8
"read from the first number of human-readable symbols based" should read, --read from the first number of human-readable characters based--.

Column 16, Line 60, Claim 8
"readable symbols using Reed-Solomon code information" should read, --readable characters using Reed-Solomon code information--.

Column 17, Line 18, Claim 10
"characters; and" should read, --characters;--.

Column 18, Lines 5-6, Claim 10
"characters using error correction information encoded in the second number of human-readable characters." should read, --symbols using error correction information encoded in the second number of human-readable symbols.--.